United States Patent [19]

Chamberlin et al.

[11] 4,081,362

[45] Mar. 28, 1978

[54] APPARATUS FOR MECHANICALLY SORTING FRUIT

[75] Inventors: Donald W. Chamberlin, Los Gatos; Donald W. Irving, San Jose, both of Calif.

[73] Assignee: FMC Corporation, San Jose, Calif.

[21] Appl. No.: 707,744

[22] Filed: Jul. 22, 1976

[51] Int. Cl.² .............................................. B65G 47/34

[52] U.S. Cl. .................................................. 209/74 R

[58] Field of Search .................... 209/74, 74 M, 111.6, 209/111.7, 111.8, 111.5

[56] References Cited

U.S. PATENT DOCUMENTS

| | | | |
|---|---|---|---|
| 2,933,185 | 4/1960 | Coleman et al. | 209/74 R |
| 3,278,021 | 10/1966 | Schultze | 209/74 R |
| 3,381,819 | 5/1968 | Crawford | 209/73 |
| 3,460,673 | 8/1969 | Sanner | 209/74 R |

*Primary Examiner*—Allen N. Knowles

*Attorney, Agent, or Firm*—R. S. Kelly; L. B. Guernsey; C. E. Tripp

[57] ABSTRACT

A paddle mounted on a fruit sorter at the end of a fruit conveyor is connected to the plunger of a solenoid which normally is actuated to bias the paddle into the path of fruit being discharged from the conveyor toward a good-fruit discharge conveyor. A color sorter is positioned to scan the fruit leaving the conveyor, and means are provided to de-energize the solenoid upon the detection of a good fruit to allow the paddle to be moved from the path of the fruit so that the fruit will fall onto the discharge conveyor. Power to operate the solenoid is provided by a circuit which develops a relatively large value of current upon initial energization of the solenoid. This large current acts to quickly move the paddle into the path of any cull fruit or non-fruit leaving the conveyor to deflect such items from the discharge conveyor. The sorter circuitry provides a much smaller amount of current after the initial surge to retain the paddle in its deflecting mode until a good fruit is again scanned. When the solenoid is de-energized its travel is limited by a soft spring so that its return to the deflecting position will be rapid, said spring being readily yieldable if the paddle is hit by a good fruit moving toward the discharge conveyor.

10 Claims, 5 Drawing Figures

FIG_3
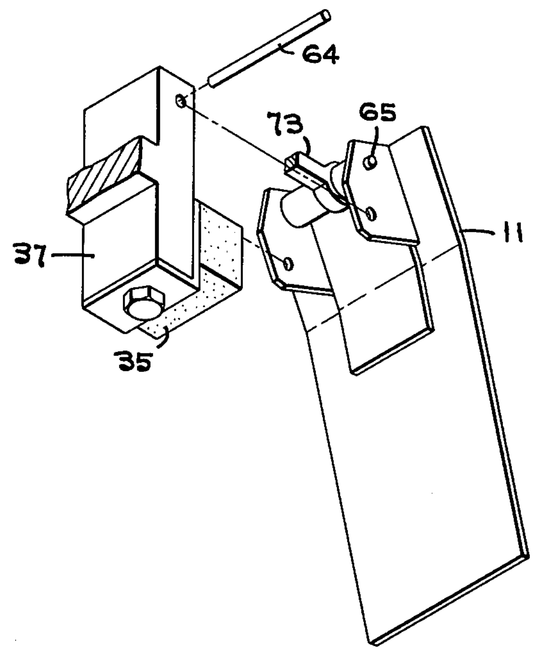
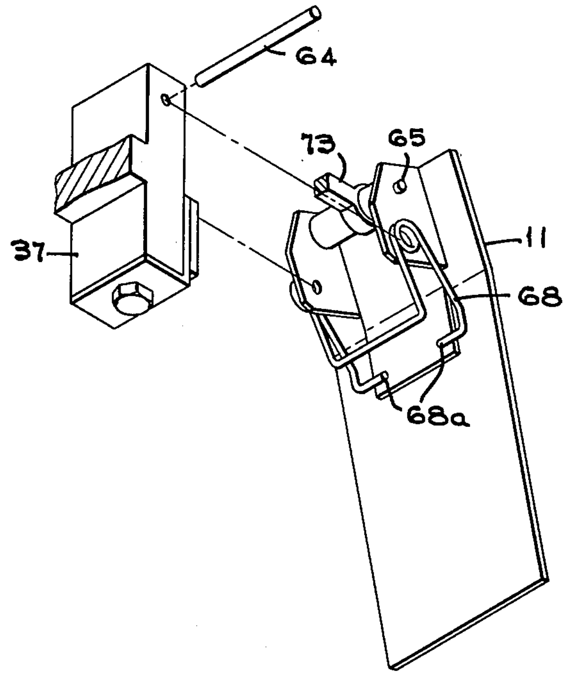
FIG_4

APPARATUS FOR MECHANICALLY SORTING FRUIT

BACKGROUND OF THE INVENTION

1. Field of the Invention

The present invention pertains to apparatus for mechanically sorting fruit, and more particularly, it pertains to deflecting apparatus for selectively diverting falling fruit into a desired trajectory.

2. Description of the Prior Art

Colorimetry, i.e., the analysis of an object upon the basis of its color has been used in a variety of apparatus for sorting fruit and vegetables according to color. Color sorting apparatus which has been specifically designed for the sorting of fruits or vegetables generally provides some means for measuring the reflectance property of the fruit or vegetable being tested. The reflectance of a surface is a measure of the percentage of incident light reflected by it, and colored objects have different reflectances for light of different wavelengths. The relationship between reflectance and the illuminating wavelength of a fruit being tested will produce a characteristic curve which can then be used in the design of apparatus and circuitry for color sorting that fruit. That is to say, a fruit may be classified as to color by suitably measuring, describing and classifying its reflectance curve, and food may be sorted into different grades by denoting the differences between the reflectance curves for the various grades and testing for these differences.

Signals from two or more photoelectric cells, each of which measures the quantity of light reflected in a different wavelength have been used to determine that fruit is ripe, or too green, or overripe. Any signal developed due to a green or, perhaps, due to an overripe fruit will be directed to a reject mechanism which will divert the cull fruit to a separate discharge location.

Despite the development of such mechanical sorting means, field harvesting vehicles (such as tomato harvesters) have not generally used them heretofore due to the difficulties of successfully sorting under field conditions as opposed to packing house conditions. In prior art field harvesters the sorting was generally done by human operators who stand on a platform adjacent moving conveyor belts carrying the produce, pick up the cull fruit, and manually discharge them as the harvester moves across the field. This prior art method of sorting tomatoes, for example, is expensive due to the number of people needed to sort the fruit on the moving conveyor belts. The efficiency and accuracy of the sorting is dependent upon the people involved so that the quality of the sorting varies with different individuals and with different times of the day. After prolonged periods of sorting, the human sorter may become tired and not do a good job. What has been needed is apparatus that can perform sorting of tomatoes or other fruit at a lower cost and in a more consistent manner than in prior art harvesters.

Mechanical sorting of objects such as fruit has been carried out by devices which permit the fruit to gravitate between a pair of conveying means with a selectively actuatable diverter, under the control of the color scanning means, being positioned at the gap between the conveying means to divert the rejected fruit from its normal trajectory. Such diverters have been comprised of air blast devices, which can be messy and ineffective if soft fruit is encountered, or power-actuated paddles.

The paddles have been moved by solenoid devices and pneumatic or hydraulic cylinders. Such mechanisms are shown, for example, in U.S. Pat. Nos. 3,381,819 to Crawford, 3,581,888 to Kelly et al, 3,489,277 to Silverman, and 3,675,769 to Story. Despite the widespread use of selectively actuatable diverting mechanisms for use in sorting operations, no wholly suitable diverting device has heretofore been provided which can operate under the conditions imposed by field sorting operations where speed of operation is essential and wherein significant size and weight differences exist between the fruit or foreign objects (e.g., dirt clods) being scanned.

SUMMARY OF THE INVENTION

With the apparatus of the present invention a simple and yet highly effective means is provided for rejecting any cull fruit or non-fruit (e.g., dirt clods) which may be carried by a conveyor along with the desired fruit. Fruit being discharged from the end of the conveyor falls toward a good-fruit location adjacent to the end of the conveyor. The apparatus includes a paddle mounted near the discharge point of the conveyor and power means for positioning the paddle in the path of the fruit being discharged from the end of the conveyor to deflect cull fruit or non-fruit from the good-fruit location in response to a reject signal provided by conventional color sorting circuitry which energizes said power means. The reject signal is provided continuously unless there is a good fruit within the viewing area of the color sorting scanning mechanism at the end of the conveyor. Spring return means are provided for moving the paddle from the reject position in the absence of a reject signal to allow good fruit to move past the paddle into the good-fruit location.

In the preferred form of the invention the spring return means is formed of a spring which rapidly returns the paddle to a position where it is at least partially out of the path of fruit being discharged toward said good-fruit location, and a second, relatively weak spring is provided so that the paddle may further deflect if it is struck by the falling good fruit. Thus, the amount of movement of the paddle is limited, in order to increase its speed of operation, without creating errors in the rejection process.

BRIEF DESCRIPTION OF THE DRAWINGS

FIG. 3 is an isometric view of the paddle used in the reject mechanism of FIG. 1.

FIG. 4 is an isometric view of an alternative embodiment of the paddle and the means for mounting said paddle.

DESCRIPTION OF THE PREFERRED EMBODIMENT

Figure 1:
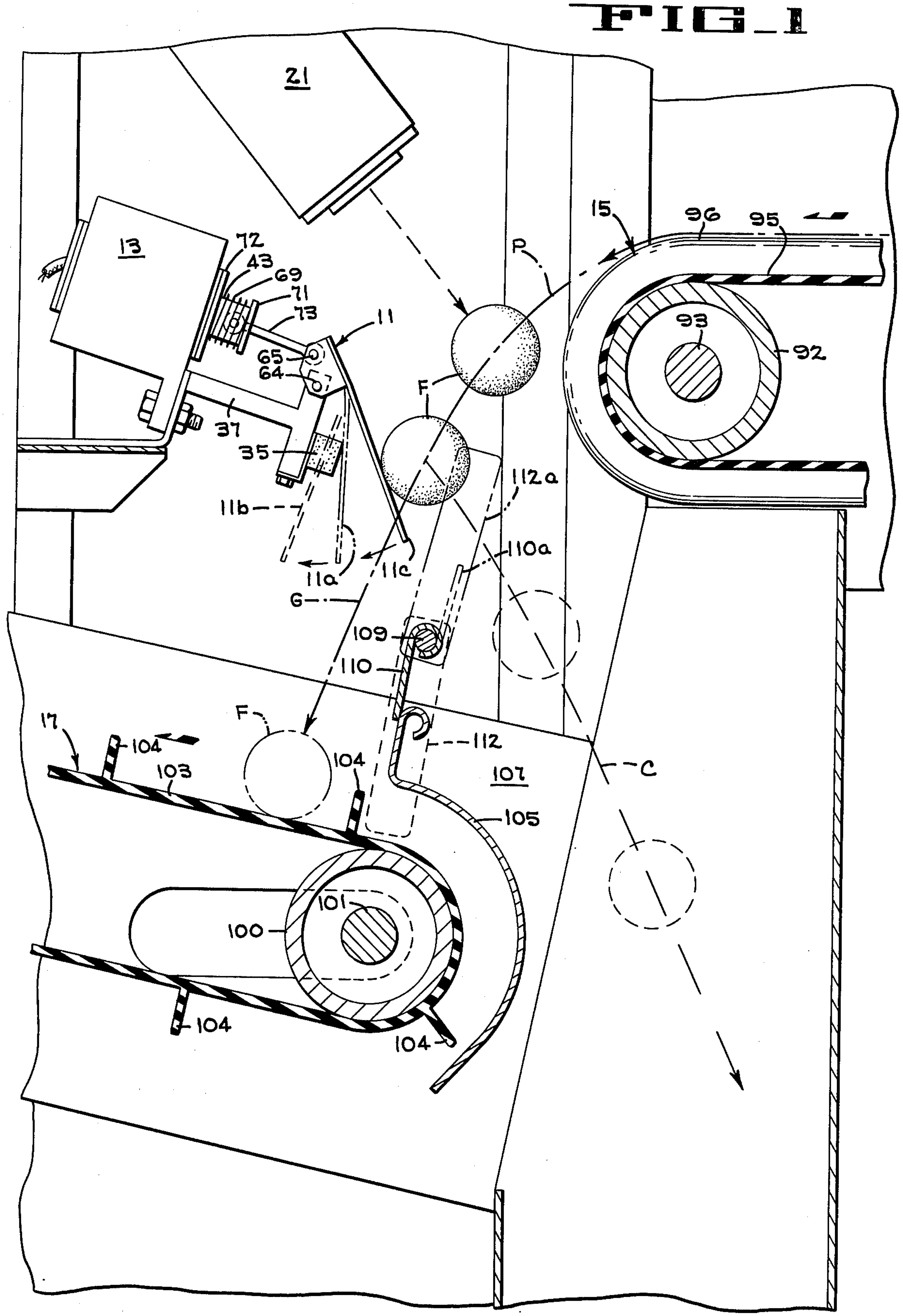
FIG. 1 is a side elevation of the reject mechanism of the present invention with the fruit conveying and discharge means being shown in section.

The apparatus for rejecting cull fruit and non-fruit (such as dirt clods), as shown in FIG. 1, includes a paddle 11 which is used to either permit fruit ejected from a supply conveyor 15 to gravitate to a good-fruit conveyor 17 or to deflect it therefrom. A solenoid 13 moves the paddle into deflecting position, and electronic circuitry (FIG. 2) provides a reject signal for activating the solenoid. Fruit leaving the end of the supply conveyor 15 has sufficient velocity so that it falls through the space in a trajectory that directs it toward the good-fruit conveyor 17. As the fruit falls through space between the conveyor 15 and the paddle the fruit is illuminated by an overhead light from a light source 21. As shown diagrammatically in FIG. 2, the light reflected from the fruit is directed to a pair of photosensitive cells 23 and 25. A pair of filters 27 and 29 restrict the wavelengths of light received by the cells so that light of different wavelength bands is received by each of the photocells 23 and 25. A logic circuit 31 makes a determination as to whether the fruit is a cull or a non-fruit and provides a reject signal to an input terminal 33 (FIG. 2) any time there is an absence of a good fruit leaving the end of the conveyor 15. The circuitry for scanning the fruit and for providing the reject signal is not a part of the present invention and any conventional color sorting apparatus can be used for this purpose. By way of example, an operative circuit for providing a reject signal of the type desired is shown in an application of Donald W. Irving et al, Serial No. 707,743, filed on even date herewith, and such circuit is specifically incorporated by reference herein. The details of the scanning and optical apparatus can be as shown in prior U.S. Pat. Nos. 3,770,111 to Charles S. Greenwood et al or 2,625,265 to David C. Cox.

FIGS. 1 and 3 show one embodiment of the apparatus for mounting the reject paddle 11 in the path of the fruit F being discharged from the supply conveyor 15. The paddle 11 is pivotally mounted by a pin 64 to a portion of the frame 37. The upper end of the paddle is pivotally connected to the projecting end of an arm 73 by a pin 65 which is located above pin 64 (FIG. 1). The other end of the arm 73 is pivotally connected to the armature 43 of the solenoid 13. A small compression spring 69 is connected between a washer 71 secured to arm 73 and a washer 72 secured to the fixed structure of the solenoid to bias the paddle 11 into the position 11*a* when the solenoid is de-energized. In order to obtain a rapid response the position 11*a* is such that some or all of the good fruit ejected from conveyor 15 may strike the paddle. However, the paddle is supported in position 11*a* by a secondary spring means 35 which is comprised of a piece of sponge rubber or the like which is readily yieldable and which provides a relatively weak spring force. For example, when a large good fruit strikes the surface of the paddle the resilient material of spring means 35 readily compresses so that the paddle can move into the position shown at 11*b* and allow the fruit to fall onto the good-fruit conveyor 17. The position 11*a* of the unactuated paddle should be chosen such that the small good fruit will either miss the paddle altogether or just barely brush it without being deflected. Also, the spring 69 should be relatively weak so that in the event a good fruit closely follows a cull fruit off the conveyor 15 the good fruit can strike the paddle as it is being moved rearwardly without being deflected.

Details of the supply conveyor 15 and the good-fruit conveyor 17 are seen in FIG. 1. The supply conveyor 15 includes an idler roller 92 mounted on a rotatable shaft 93. Mounted about the roller 92 is an endless conveyor belt 95 having a plurality of transversely spaced, longitudinally extending ridges 96 being provided thereon, only one of which is shown. The ridges form channels therebetween so that the fruit moves in a single file toward the discharge end of the conveyor. When the fruit reaches the end of the conveyor it falls toward the good-fruit conveyor 17 in an arc illustrated by the path P. The acceleration of gravity causes a space to develop between the individual fruit so that a single fruit is illuminated at any one instant of time by the light source 21 and is accepted or rejected by the appropriate color sorting circuitry. Any cull fruit or non-fruit strikes the paddle 11 at its actuated position 11*c* and is deflected along the path C to the ground or other discharge location.

When a good fruit is sensed by the sorting circuits the solenoid 13 is de-energized and the paddle is rapidly moved into position 11*a* by spring 69 so that the fruit follows the path G to the good-fruit conveyor 17. The conveyor 17 includes an idler roller 100 mounted on a rotatable shaft 101. Mounted about the roller is an endless conveyor belt 103 which has its conveying run inclined upwardly relative to the horizontal. The conveyor belt is provided with a plurality of spaced cleats 104 which aid in moving the fruit upwardly along the incline. A curved shield 105 is mounted between a pair of side walls 107, only one of which is shown in FIG. 1, at the lower end of the conveyor 17 to prevent the cull tomatoes from falling onto the end portion of the belt 103. The shield also prevents good tomatoes from falling off the end of the conveyor belt 103 and being discharged with the cull tomatoes.

A cylindrical rod 109, which is also mounted between the side walls 107, aids in dividing the good fruit from the cull fruit. The rod 109 is rotatably mounted above the belt with the length of the rod extending parallel to the axis of the shaft 101. Also mounted about the rod and along the length of the rod 109 is a vane 110 and a handle 112 is secured to one end of the rod 109 to permit it to be rotated. When fruit is ejected from conveyor 15, the rod 109 and vane 110 thereby provide a divider to separate the good fruit from the cull fruit. The handle and vane aid in removing vines or the like which may collect on the top of rod 109. Unless these vines are removed frequently they accumulate along the rod 109 and interfere with the movement of fruit as it falls toward the conveyor belt 103. The vane normally rests in the position as shown in full lines in FIG. 1, and the handle 112 is normally in the position shown in FIG. 1 while the vines collect on top of the rod. Rotating the handle in a clockwise (FIG. 1) direction to position 112*a* (FIG. 1) causes the vane to rotate in a clockwise direction about the axis of the rod 109 to position 110*a* and allows the vines to drop and be discharged.

FIG. 4 discloses another embodiment of the apparatus used to position the paddle in the path of fruit leaving the supply conveyor 15. In this embodiment of the invention a spring 68 is provided in place of the springs 69 and 35 of the first described embodiment. The spring 68 is a torsion spring with the looped mid-portion thereof being received about pin 64. One arm of the spring 68 is connected to the paddle at points 68*a* and the other arm of the spring is secured to the frame 37 of the apparatus. In its relaxed position the spring holds the paddle in the center position 11*a* shown in FIG. 1. When the spring is flexed by movement of the arm 73 when the solenoid is energized or when the spring is flexed due to engagement of the paddle by a good fruit, the restoring force of the spring will return the paddle to the 11*a* position once the flexing force has been removed. A thin piece of resilient material 36 cushions the paddle if it is deflected too far inwardly and prevents the paddle from striking the frame 37 as it is moved toward the position 11*b*.

Figure 2:
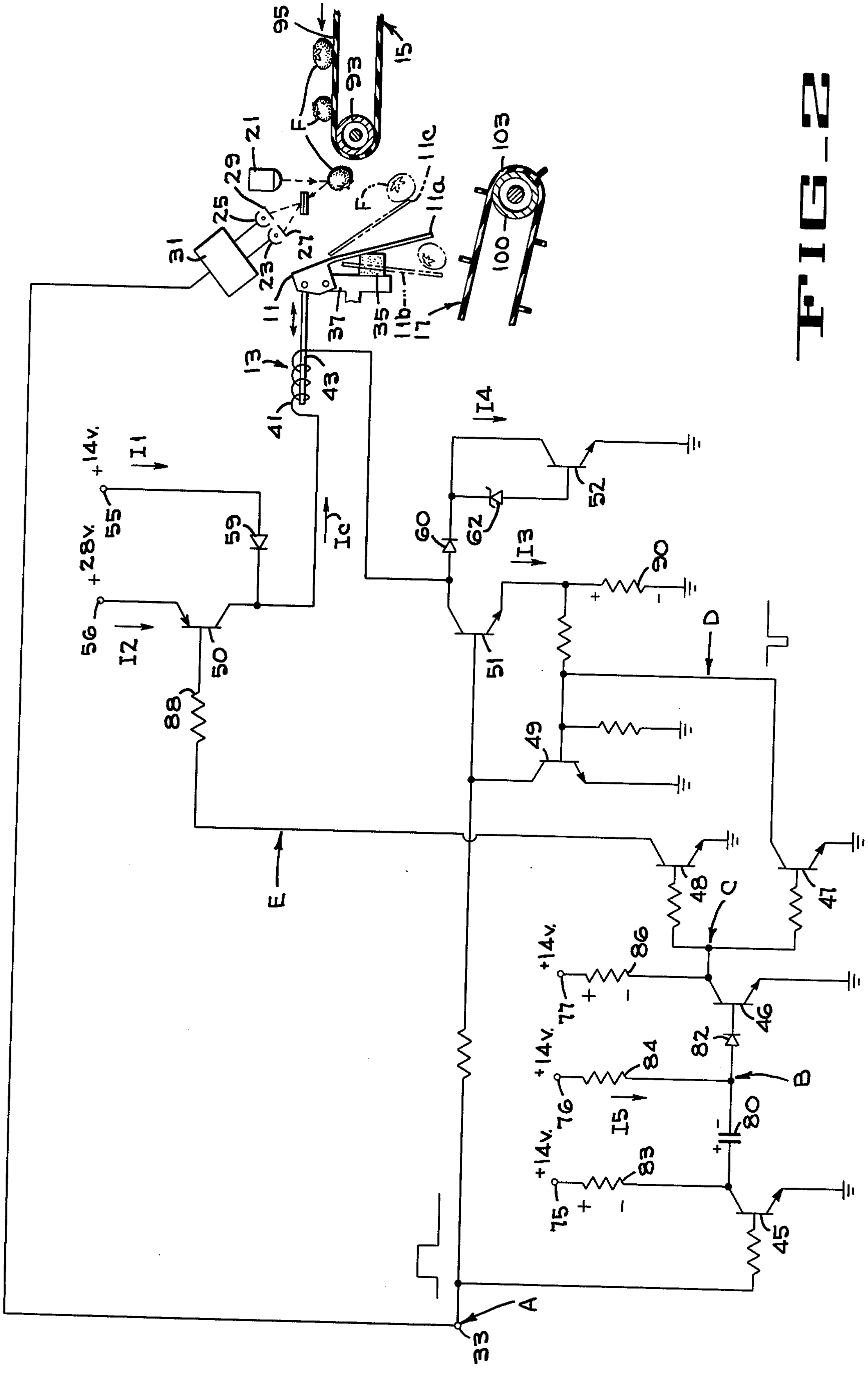
FIG. 2 is a schematic diagram of the reject circuitry for operating the reject apparatus of FIG. 1.

The circuitry for actuating the solenoid 13 is shown in FIG. 2. This circuitry provides a high initial current when a reject signal is developed by the logic circuit 31. This large current quickly pulls the solenoid armature 43 into the coil and moves the paddle into the reject position shown at 11*c*. The circuitry then develops a smaller solenoid current to hold the paddle in the reject position until an "accept signal" is developed by logic circuit 31, i.e., until the absence of a positive signal from circuit 31. The reject signal, disclosed as a positive value of voltage in waveform A of FIG. 5, is developed by logic circuit 31 anytime there is an absence of a good fruit moving past off the end of conveyor 15.

Figure 5:
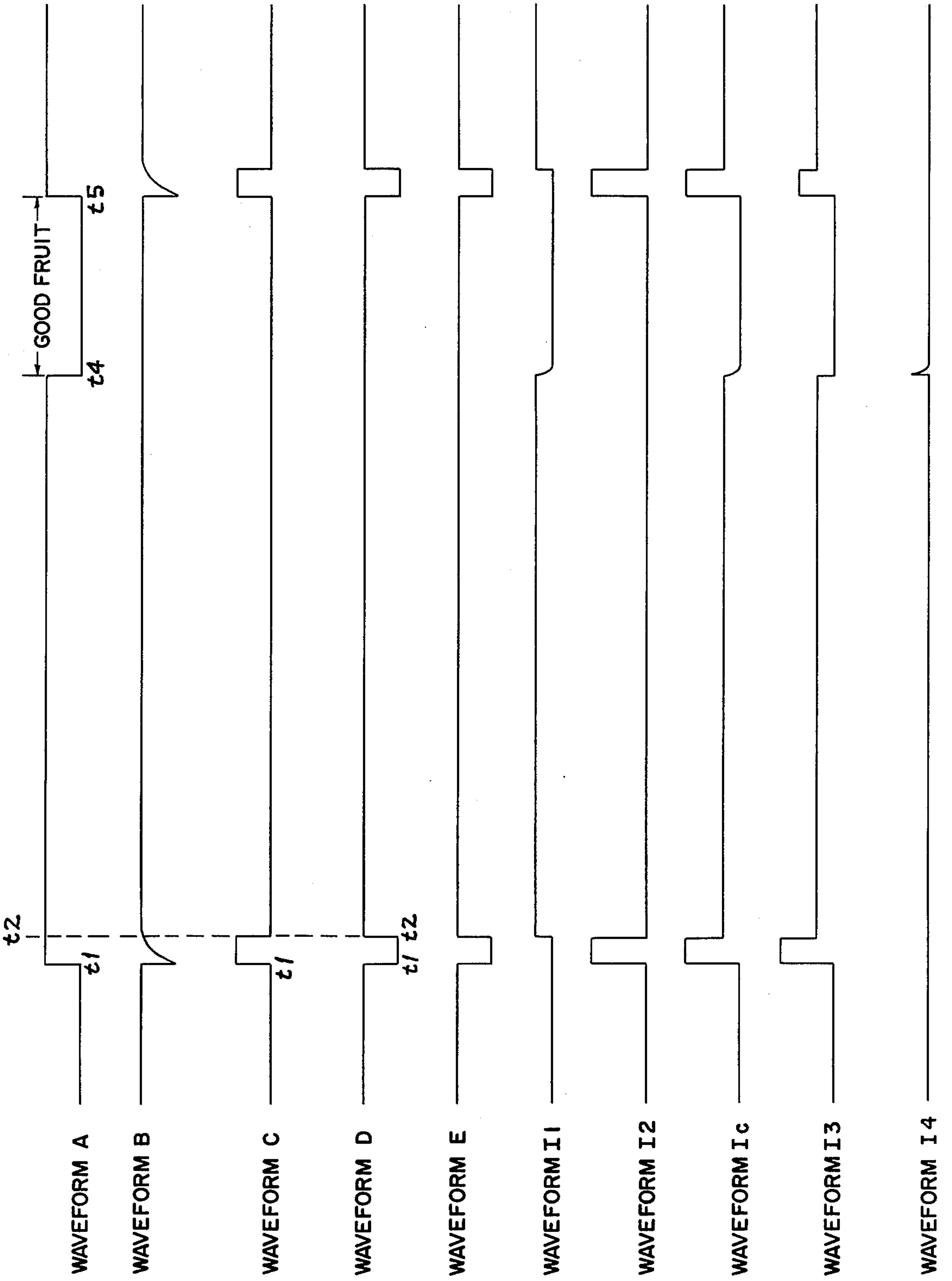
FIG. 5 illustrates waveforms which are useful in explaining the operation of the circuitry of FIG. 2.

Levels of the voltage and current at various points in the circuit of FIG. 2 are disclosed in the waveforms of FIG. 5. For example, the waveform of the voltage developed by the logic circuit 31 and coupled to input terminal 33 is shown in waveform A of FIG. 5. The locations of other voltage and current waveforms of FIG. 5 (B, C, D, E, I1, I2, I*c*, I3 and I4) are shown on FIG. 2.

Prior to the time *t*1 (FIG. 5) a good fruit has caused the logic circuit 31 to provide a low value of output voltage so that transistors 45, 47, 48, 49, 50, 51 and 52 of FIG. 2 are all rendered nonconductive. The transistors 45 and 51 are rendered nonconductive by the low value of voltage coupled from the input terminal 33 to the base of each of these transistors. When transistor 45 is nonconductive transistor 46 is rendered conductive by a current I5 which flows from a terminal 76, through a resistor 84, a diode 82 and from the base to the emitter of transistor 46. When transistor 46 is conductive a current flows from a terminal 77 through a resistor 86 and from collector to emitter of transistor 46 thereby providing a large voltage drop of the polarity shown across resistor 86. The voltage drop across resistor 86 subtracts from the voltage at the terminal 77 to provide a low value of voltage at the collector of transistor 46 thereby rendering transistors 47 and 48 nonconductive. When transistor 48 is nonconductive current cannot flow from the emitter to the base of transistor 50 whereby transistor 50 will be nonconductive. When transistors 50 and 51 are nonconductive there is no current flow in the solenoid coil 41, so that the paddle 11 will have been moved into the position 11*a*. When transistor 45 is nonconductive the voltage at the collector is equal to the voltage at terminal 75 so that capacitor 80 between transistors 45 and 46 charges to the polarity shown.

At time *t*1 the good fruit has passed out of the detection area and has been allowed to fall toward the good-fruit conveyor 17 and the absence of a good fruit at the detection area will cause the logic circuit 31 to develop a positive voltage which is coupled to the input terminal 33 and to the bases of transistors 45 and 51 thereby causing transistors 45 and 51 to be rendered conductive. When transistor 45 is rendered conductive a current flows from terminal 75 through a resistor 83 and transistor 45 thereby providing a voltage drop of the polarity shown across resistor 83. The voltage drop across resistor 83 subtracts from the voltage at terminal 75 to provide a low value of voltage at the collector of transistor 45. The low value of voltage at the collector of transistor 45 and the voltage across capacitor 80 provide a negative voltage at the base of the transistor 46. The negative voltage at the base of transistor 46 renders this transistor nonconductive so that the voltage on the collector of transistor 46 rises to a positive value thereby causing transistors 47 and 48 to be rendered conductive.

When transistor 48 is rendered conductive the impedance of transistor 48 is low so that a relatively large current flows from a terminal 56, through the emitter to base of transistor 50, through a resistor 88 and from collector to emitter of transistor 48. The relatively large emitter to base current of transistor 50 renders transistor 50 conductive and causes its impedance to be relatively low. At this same time the full positive voltage on the input terminal 33 is provided at the base of transistor 51 causing the impedance of transistor 51 to be low. A relatively large value of current I2 flows from terminal 56, through transistor 50, through the solenoid coil 41, and through transistor 51 and a resistor 90 to ground. This current I2 then provides the solenoid current I*c* during this time period. This large current through the solenoid coil causes the armature 43 to be quickly pulled into the solenoid coil and causes the paddle to be moved into the reject position 11*c*.

At a time *t*2, as shown in FIG. 5, the capacitor 80 has been discharged so that the transistor 46 is no longer rendered nonconductive, and it will be rendered conductive by the voltage at terminal 76. When transistor 46 again is conductive the voltage on the collector of transistor 46 decreases so that transistors 47 and 48 are rendered nonconductive. When transistor 48 is rendered nonconductive the transistor 50 is also rendered nonconductive. At this time *t*2, the current I2 ceases and the solenoid current I*c* is provided by a current I1 which flows from a terminal 55, through a diode 59, through the coil 41 of the solenoid and through transistor 51 and the resistor 90 to ground. The voltage is smaller at terminal 55 than it is at terminal 56; thus, the current I1 is less than the current I2. Thus, between times *t*2 and *t*4 the only value of current, I*c*, flowing through the solenoid coil, is the current I1 which flows through diode 59 and through the transistor 51. However, current I1 is large enough to hold the armature 43 inside the coil and to hold the paddle in the reject position 11*c*.

At time *t*4 another good fruit causes the voltage on the input terminal 33 to decrease so that the transistors 45 and 51 are again rendered nonconductive. When transistor 51 is nonconductive, the inductance of the solenoid coil produces a positive voltage at the collector of transistor 51. The positive voltage at the collector of transistor 51 is coupled through the diode 60 and causes a Zener diode 62 to be rendered conductive. When the Zener diode 62 is conductive a current I4 flows from the collector of transistor 51 through diodes 60 and 62, from base to emitter of a transistor 52 thereby rendering transistor 52 conductive. When transistor 52 is conductive the amplitude of the voltage at the collector of transistor 51 is limited so that transistor 51 is protected from damage due to excessively large voltages. The inductance of the solenoid coil causes a current to flow from the terminal 55, through diode 59, solenoid coil 41, diode 60 and transistor 52 to ground. This current causes the voltage across the solenoid coil to quickly drop to a value of zero.

Transistor 49 aids in limiting the value of current I3 flowing in transistor 51 between times *t*2 and *t*4, but does not limit the value of current I3 between times *t*1 and *t*2. Between times *t*2 and *t*4 transistor 47 is nonconductive as described hereinbefore so that the positive voltage across the resistor 90 provides a base-to-emitter current in transistor 49 thereby rendering transistor 49 conductive. When transistor 49 is conductive the collector to emitter voltage is low so that the base to emitter current of transistor 51 is relatively low. The low value of base to emitter current in transistor 51 limits the value of collector-to-emitter current I3 to a low value. Thus, the current Ic through the solenoid coil is further limited by the transistor 49 during this time period.

Between times $t1$ and $t2$ transistor 47 is conductive so that the voltage at the collector of transistor 47 and at the base of transistor 49 is low. This low value of voltage renders transistor 49 nonconductive. When transistor 49 is nonconductive the voltage at the base of transistor 51 increases so that the base-to-emitter current in transistor 51 increases. The increase in base-to-emitter current causes the current I3 to increase.

It will be understood that conventional power supply means are to be used to provide the reference voltages of 28 volts and 14 volts at terminals 55, 56 and 75–77 as indicated.

Although the best mode contemplated for carrying out the present invention has been herein shown and described, it will be apparent that modification and variation may be made without departing from what is regarded to be the subject matter of the invention.

What is claimed is:

1. In a fruit sorter having a conveyor for carrying fruit and for discharging fruit from the end of said conveyor with a good-fruit location being provided adjacent the end of said conveyor so that fruit discharged from the end of said conveyor falls toward said good-fruit location, apparatus for rejecting cull fruit or non-fruit and for accepting good fruit, said apparatus comprising:

a paddle, said paddle being mounted on said fruit sorter adjacent to said good-fruit location;

means for scanning a fruit moving past the end of the conveyor in a viewing area to determine color characteristics of said fruit and for making a decision based upon such color characteristics as to whether said fruit is a good fruit or a cull fruit;

means connected to said last named means for generating a continuous reject signal at all times during the operation of said sorter in the absence of a good fruit within said viewing area;

power-actuated means for positioning said paddle in a reject position in the path of fruit discharged from the end of said conveyor in response to said reject signal to thereby deflect all cull fruit or non-fruit from said good-fruit location; and spring return means for moving said paddle from said reject position in the absence of a reject signal, said spring return means thereby allowing good fruit to move past said paddle into said good-fruit location.

2. Apparatus for rejecting cull fruit as defined in claim 1 wherein said power-actuated means for positioning said paddle includes a solenoid having a coil and a movable armature, said armature being connected to said paddle.

3. Apparatus for rejecting cull fruit as defined in claim 2 including circuit means for energizing said coil in response to said reject signal.

4. In a fruit sorter having a conveyor for carrying fruit and for discharging fruit from the end of said conveyor with a good-fruit location being provided adjacent the end of said conveyor so that fruit discharged from the end of said conveyor falls toward said good-fruit location, said sorter having means for generating a reject signal in the absence of a good fruit moving past the end of said conveyor, apparatus for rejecting cull fruit or non-fruit in response to said reject signal and for accepting good fruit in the absence of a reject signal, said apparatus comprising:

a paddle, said paddle being mounted on said fruit sorter adjacent to said good-fruit location;

power-actuated means for positioning said paddle in a reject position in the path of fruit discharged from the end of said conveyor in response to said reject signal to thereby deflect cull fruit or non-fruit from said good-fruit location; and spring return means for moving said paddle from said reject position in the absence of a reject signal, said spring return means thereby allowing good fruit to move past said paddle into said good-fruit location, said spring return means including a spring for biasing said paddle in one direction to a retracted position away from said reject position, and resilient means for biasing said paddle in the opposite direction into said retracted position.

5. In a fruit sorter having a conveyor for carrying fruit and for discharging fruit from the end of said conveyor with a good-fruit location being provided adjacent the end of said conveyor so that fruit discharged from the end of said conveyor falls toward said good-fruit location, said sorter having means for generating a reject signal in the absence of a good fruit moving past the end of said conveyor, apparatus for rejecting cull fruit or non-fruit in response to said reject signal and for accepting good fruit in the absence of a reject signal, said apparatus comprising: a paddle, said paddle being mounted on said fruit sorter adjacent to said good-fruit location; power-actuated means for positioning said paddle in a reject position in the path of fruit discharged from the end of said conveyor in response to said reject signal to thereby deflect cull fruit or non-fruit from said good-fruit location; spring return means for moving said paddle from said reject position in the absence of a reject signal, said spring return means thereby allowing good fruit to move past said paddle into said good-fruit location; and an upright barrier to divide the fruit falling toward said good-fruit location from the deflected fruit, and means for mounting said barrier with the length thereof extending substantially parallel to the end of said conveyor so that good fruit falls to one side of said barrier and cull fruit or non-fruit falls to the other side of said barrier after striking said reject means.

6. Apparatus for rejecting cull fruit as defined in claim 5 wherein said dividing barrier comprises a rod and a vane, means for connecting one edge of said vane along the length of said rod so that said vane hangs below said rod, and means for rotating said rod about its longitudinal axis to remove any vines which have collected thereon.

7. In a fruit sorter having a conveyor for carrying fruit and for discharging fruit from the end of said conveyor with a good-fruit location being provided adjacent the end of said conveyor so that fruit discharged from the end of said conveyor falls toward said good-fruit location, said sorter having means for generating a reject signal in the absence of a good fruit moving past the end of said conveyor, apparatus for rejecting cull fruit or non-fruit in response to said reject signal and for accepting good fruit in the absence of a reject signal, said apparatus comprising:

a paddle, said paddle being mounted on said fruit sorter adjacent to said good-fruit location;

power-actuated means for positioning said paddle in a reject position in the path of fruit discharged from the end of said conveyor in response to said reject signal to thereby deflect cull fruit or non-fruit from said good-fruit location, said power-actuated means including a solenoid having a coil and a movable armature, said armature being connected to said paddle;

circuit means for energizing said coil in response to said reject signal, said circuit means including means for providing a relatively large current to said coil for a predetermined relatively short period of time to quickly move said armature into an energized position and means for providing a smaller value of current to said coil after said predetermined short period of time to retain said armature in said energized position in response to said reject signal; and spring return means for moving said paddle from said reject position in the absence of a reject signal, said spring return means thereby allowing good fruit to move past said paddle into said good-fruit location.

8. Apparatus for rejecting cull fruit as defined in claim 7 wherein said circuit means includes:

means for providing first, second and third reference potentials with the first potential being higher than the second potential and with the second potential being higher than the third potential;

first, second and third switches;

means for connecting one end of said solenoid coil to said first switch and the other end of said solenoid coil to said second and said third switches;

means for connecting said first reference potential to said first switch;

means for connecting said third reference potential to said second and third switches;

means connecting said second reference potential and said one end of said solenoid coil;

means for closing said second switch in response to said reject signal; and means for closing said first and said third switches in response to said reject signal only for said predetermined short period of time.

9. Apparatus for rejecting cull fruit according to claim 7 including diode means connected between said second reference potential and said first switch for disconnecting said second reference potential when said first switch is closed.

10. In a fruit sorter having a conveyor for carrying fruit and for discharging fruit from the end of said conveyor with a good-fruit location adjacent the end of said conveyor so that fruit discharged from the end of said conveyor falls toward said good-fruit location, said sorter having means for detecting good fruit being discharged from the end of said conveyor and for providing means for energizing and de-energizing a fruit reject apparatus, said fruit reject apparatus for rejecting cull fruit or non-fruit comprising:

a paddle, said paddle being mounted on said fruit sorter adjacent to said good-fruit location;

power means for positioning said paddle into a position to deflect cull fruit or non-fruit from said good-fruit location upon energization thereof;

first spring means for rapidly biasing said paddle to a retracted position at least partially out of the path of fruit being discharged from said conveyor upon de-energization of said power means; and second spring means for permitting said paddle to readily deflect from said retracted position into a further retracted position when the paddle is engaged by a good fruit so that said good fruit will not be deflected from said good-fruit location.

* * * * *